No. 664,960. Patented Jan. 1, 1901.
H. MASCHMEYER.
OIL SEPARATOR AND AUTOMATIC REGULATING VALVE FOR REFRIGERATING SYSTEMS.
(Application filed Sept. 5, 1900.)
(No Model.)

Witnesses. Inventor.
Hermann Maschmeyer
By Benedict & Morsell
Attorneys.

UNITED STATES PATENT OFFICE.

HERMANN MASCHMEYER, OF MILWAUKEE, WISCONSIN, ASSIGNOR OF ONE-FIFTH TO JOHN A. HILL, OF SAME PLACE.

OIL-SEPARATOR AND AUTOMATIC REGULATING-VALVE FOR REFRIGERATING SYSTEMS.

SPECIFICATION forming part of Letters Patent No. 664,960, dated January 1, 1901.

Application filed September 5, 1900. Serial No. 29,046. (No model.)

*To all whom it may concern:*

Be it known that I, HERMANN MASCH-MEYER, of Milwaukee, in the county of Milwaukee and State of Wisconsin, have invented a new and useful Improvement in Oil-Separators and Automatic Regulating-Valves for Refrigerating Systems, of which the following is a description, reference being had to the accompanying drawings, which are a part of this specification.

My invention has relation to improvements in oil-separators and automatic regulating-valves for refrigerating systems.

It is a well-known fact to those familiar with refrigeration that in refrigerating machinery the liquid ammonia will take up lubricating-oil and carry the same along therewith. This necessarily is extremely objectionable. To guard against this, expansion cocks or valves have been provided; but these are objectionable, owing to the expense attendant upon their use.

It is the primary object of my invention, therefore, to provide an improved and inexpensive arrangement for preventing the oil from passing into the refrigerating-pipes.

With this primary object and other incidental objects in view the invention consists of the devices and parts or their equivalents, as hereinafter set forth.

Figure 1:
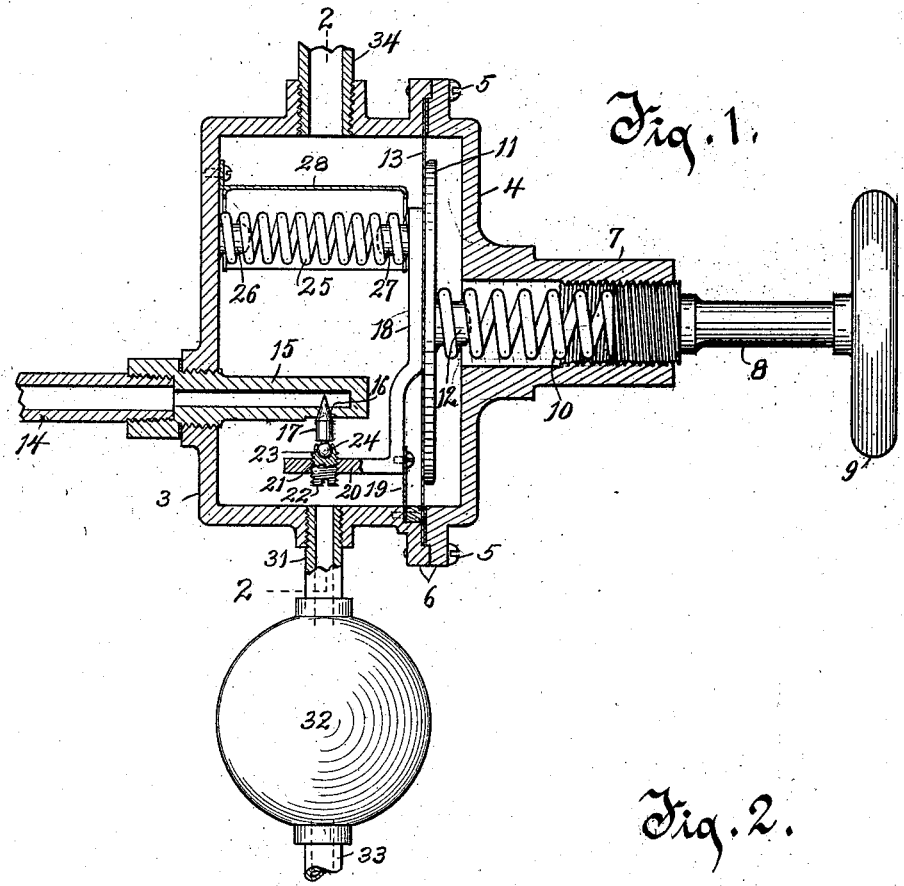
Figure 2:
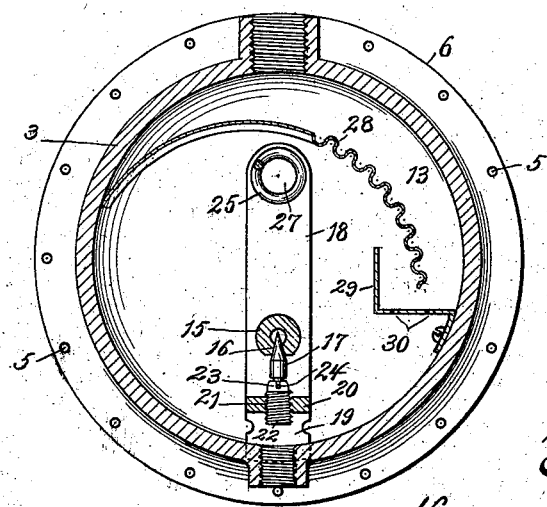

In the accompanying drawings, Figure 1 is an elevation of my invention with the casing in section and other parts in section and broken away, and Fig. 2 is a section on the line 2 2 of Fig. 1.

Referring to the drawings, the numeral 3 indicates a casing of any desirable and suitable form of construction, preferably of the cylindrical form shown in the drawings. One of the side pieces 4 of this casing is detachably connected by means of screws 5, engaging registering flanges 6 6. The side piece 4 has projecting outwardly therefrom a tubular interiorly-threaded extension 7, the inner threads being engaged by the threaded inner end of a spindle 8, said spindle being provided on its outer end with a hand-wheel 9 for convenience in turning the same. A coiled spring 10 is arranged within the tube 7, said spring being interposed between the inner end of the spindle and the plate 11, arranged within the casing, the said plate having a short stud 12 extending therefrom into the coils of the spring, so as to hold the spring in engagement with a fixed point of the plate. This plate 11 bears against a diaphragm 13, said diaphragm being clamped between the flanges 6.

The numeral 14 indicates the inlet-pipe for the ammonia. This pipe has a threaded connection with the outer end of another pipe 15, the latter pipe extending through the side of the casing and into said casing for a desired distance. This pipe 15 is provided on its under side with a valve-opening 16, which is regulated by means of a valve 17. Any desirable form of valve-opening and valve may be employed; but I prefer to make the valve-opening of conical or tapering form and the upper end of the valve of a corresponding form.

Arranged adjacent to the diaphragm 13 is a valve-actuating arm 18. The lower portion of this arm is connected to the upper end of a flat spring 19, said spring forming the pivot upon which the arm swings. From its lower extremity the arm has a projection 20 at right angles thereto, and this projection is provided with a threaded opening 21. The threaded opening is engaged by a short screw 22, and the upper end of this screw is provided with a socket 23, in which fits a ball 24, formed on the lower end of the valve 17. A coiled spring 25 exerts pressure against the upper end of the arm 18. The spring is maintained in position by means of two studs 26 and 27, the former extending from the fixed side of the casing into the end of the spring and the latter extending from the arm 18 into the opposite end of the spring.

Across the upper end of the interior of the casing extends a plate 28. In the drawings a portion of the surface of this plate is shown as corrugated. If preferred, the entire surface of said plate may be corrugated. Below the end of this plate is an oil-receptacle 29, provided in its bottom with a series of openings 30.

From the under side of the casing extends an oil-pipe 31, said pipe connecting with a bulb 32, which bulb has another pipe 33 leading therefrom.

From the upper side of the casing extends an ammonia-discharge pipe 34.

In the operation of my invention it will be understood that the spring 10 is so regulated by the spindle 8 that its pressure will normally exceed the combined pressure of the spring 25 and the ammonia-gas in the casing. This therefore will cause a pressure on the plate 11 and diaphragm 13, and thereby cause a turning of the valve-actuating arm in a direction to draw the valve 17 downwardly, so as not to close the valve-opening entirely. The liquid ammonia passes through the pipe 14 and enters the pipe 15, and by reason of the cold generated by the pressure the liquid ammonia is converted into a gaseous vapor and passes through the contracted valve-opening and into the casing. The oil which may have passed into the pipe 15 is free to flow through the valve-opening to the bottom of the casing, and thence passes by way of the pipe 31 into the bulb 32, being finally discharged from said bulb through the pipe 33. If by any chance oil should get into the upper portion of the casing, such oil will be caught by the corrugated plate 28 and will pass from said plate into the oil-receptacle 29, thence through the opening 30 of said receptacle to the bottom of the casing, and thence out through the pipe 31. The gaseous ammonia is of course free to pass out of the casing through the pipe 34. If at any time the combined pressure of the spring 25 and the gaseous vapor in the casing should exceed the pressure of the spring 10, then the valve-actuating arm 18 will be acted upon in a direction to cause the valve to close or further restrict the valve-opening and remain in that position until such time as the pressure of the spring 10 again exceeds the combined pressure of the spring 25 and the ammonia-gas in the casing.

From the above description it will be seen that the device automatically adjusts itself at all times in accordance with the pressure, and a most efficient arrangement is provided for preventing the oil from passing into the refrigerating-pipes.

What I claim as my invention is—

The combination of a casing, an inlet-pipe leading into the casing, said pipe provided with a valve-opening, an ammonia-outlet pipe from the casing, an oil-discharge pipe from the bottom of the casing, a valve for regulating the valve-opening, a valve-actuating arm, an upwardly-extending spring to which the lower end of the valve-actuating arm is connected and forming a yielding pivot upon which the arm swings, and a yielding diaphragm acting upon the valve-actuating arm, the space between said diaphragm and the side of the casing forming a chamber into which the ammonia-gas is received, and said diaphragm adapted to be subjected to pressure upon opposite sides thereof, the pressure upon the side facing the ammonia-chamber being normally less than the pressure upon the opposite side, whereby the valve-actuating arm is caused to move the valve in a direction to open the valve-opening, but when the pressure in the ammonia-chamber against the side of the diaphragm facing said chamber exceeds the pressure upon the opposite side of said diaphragm, then the valve-actuating arm causes the valve to move in a direction to close or further restrict the valve-opening.

In testimony whereof I affix my signature in presence of two witnesses.

HERMANN MASCHMEYER.

Witnesses:
A. L. MORSELL,
ANNA V. FAUST.